(12) United States Patent
Hohner et al.

(10) Patent No.: US 6,211,680 B1
(45) Date of Patent: Apr. 3, 2001

(54) PROCESS AND APPARATUS FOR RECOGNIZING IGNITION FAILURES IN AN INTERNAL-COMBUSTION ENGINE HAVING TWO SPARK PLUGS PER CYLINDER

(75) Inventors: Peter Hohner, Leinfelden-Echterdingen; Juergen Schenk, Albershausen; Hartung Wilstermann, Gaildorf, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/133,427

(22) Filed: Aug. 13, 1998

(30) Foreign Application Priority Data

Aug. 13, 1997 (DE) .............................................. 197 35 010

(51) Int. Cl.$^7$ .............................. F02P 17/00; G01L 3/26
(52) U.S. Cl. .............................................. 324/398; 73/116
(58) Field of Search ..................... 324/398, 399, 324/378, 385, 393, 464; 73/116, 117, 117.1, 117.2, 117.3

(56) References Cited

U.S. PATENT DOCUMENTS

| | | |
|---|---|---|
| 5,247,919 | 9/1993 | Akaki et al. . |
| 5,305,635 | 4/1994 | James et al. . |
| 5,396,176 | 3/1995 | Ishii et al. . |
| 5,510,715 | 4/1996 | Takeuchi . |
| 5,778,855 * | 7/1998 | Damian et al. ...................... 324/388 |
| 5,861,551 * | 1/1999 | Morita et al. ......................... 324/399 |
| 5,872,312 * | 2/1999 | Kalweit ................................. 324/399 |

FOREIGN PATENT DOCUMENTS

| | | |
|---|---|---|
| 44 36 658 | 4/1995 | (DE) . |
| 44 37 480 C1 | 3/1996 | (DE) . |
| 195 24 540 C1 | 6/1996 | (DE) . |
| 195 26 644 | 7/1996 | (DE) . |
| 195 24 539 C1 | 11/1996 | (DE) . |
| 195 24 541 C1 | 12/1996 | (DE) . |
| 197 20 532 | 1/1999 | (DE) . |

* cited by examiner

*Primary Examiner*—Safet Metjahic
*Assistant Examiner*—J. Kerveros
(74) *Attorney, Agent, or Firm*—Evenson, McKeown, Edwards & Lenahan, P.L.L.C.

(57) ABSTRACT

A process for recognizing ignition failures in an internal-combustion engine which has two spark plugs per cylinder, based on a measurement of the ionic current at the spark plugs. In this process, the ionic current signals of the two spark plugs are each integrated using an assigned integrator over an entire combustion cycle and the integrator values are compared with one another. Since, in the case of a defective spark plug, an ionic current signal will occur only some time after the ignition (specifically after the arrival of the flame from the ignited spark plug), its integration value is significantly lower than that of the intact spark plug. From this information, the correct operation of the spark plugs is determined.

7 Claims, 2 Drawing Sheets

PROCESS AND APPARATUS FOR RECOGNIZING IGNITION FAILURES IN AN INTERNAL-COMBUSTION ENGINE HAVING TWO SPARK PLUGS PER CYLINDER

BACKGROUND AND SUMMARY OF THE INVENTION

This application claims the priority of German Patent Document 197,35,010.0, filed Aug. 13, 1997, the disclosure of which is expressly incorporated by reference herein.

The invention relates to a process and apparatus for recognizing ignition failures in an internal-combustion engine that has two spark plugs per cylinder, by measuring the ionic current at the spark plugs.

German patent document DE 44,37,480 discloses a process for detecting ignition failures in an internal-combustion engine having two spark plugs per cylinder, by recognizing erratic operation of the internal-combustion engine. In this instance, the first spark plug in a cylinder is tested via the erratic-operation recognition process after the second spark plug in this cylinder has been deactivated. The device required for this process results in relatively high expenditures.

It is an object of the invention to provide a process with which ignition failures can be reliably recognized in an internal-combustion Engine which has two spark plugs per cylinder, using simple devices.

This and other objects and advantages are achieved by the process and apparatus according to the invention, in which ignition failures in an internal-combustion engine having two spark plugs per cylinder are recognized from the ionic current signal of the spark plugs. Combustion failures, that is, can be recognized by measuring the ionic current at the spark plug, since in the case of a defective spark plug, no ionic current signal is present. Measurement of the ionic current supplies information regarding the condition of the burnt mixture in the area of the spark plug. If the mixture around the spark plug has not yet been burnt, no ionic current signal is generated.

Processes for diagnosing the spark plug from the ionic current signal at the spark plug are known, for example, from German Patent Documents DE 195 24 539, 195 24 540 and 195 24 541 as well as from Patent Application 197 20 532.1.

In the case of an internal-combustion engine having two spark plugs per cylinder, the two spark plugs are ignited simultaneously or with a short time shift. After the ignition, the combustion propagates in the combustion space starting from the spark plugs. Because of the flame advancing from them, the spark plugs are always situated in the burnt mixture and therefore indicate an ionic current signal. If one of the two spark plugs is defective, and therefore generates no ignition spark, no ionic current signal is generated at this spark plug until the flame from the correctly ignited spark plug reaches it, and has passed through the combustion space. An ionic current signal can be measured at the correctly ignited spark plug, on the one hand, immediately after the spark end. Accordingly, a defective spark plug can therefore be recognized reliably by comparing the integrated values of the ionic current signals of the two spark plugs with one another. This can be performed while simultaneously measuring the ionic current signals, or by using a value stored, for example, in a characteristic diagram with an alternating measurement of the ionic current signals. This is possible because, in this case, an ionic current signal will not occur before the flame has reached the defective spark plug. As a result, its integrator value is significantly lower than that of the ignited spark plug.

As a rule, defective spark plugs have either an excessive spark plug gap (because of the burning-off), or an insulator tip tear. These result in an ignition spark in the insulator, rather than a spark between the electrodes of the spark plug. These defects, however, do not impair the ionic current measurement because they occur at significantly higher voltages than in the case of the ionic current measurement. If a defective spark plug is recognized, the customer need not necessarily enter a repair shop since the intact spark plug can burn the mixture completely and no increased exhaust gas emissions will occur.

In the process and apparatus according to the present invention, a combustion failure which is not the result of a defective spark plug but, for example, is due to the failure of the injection valve, supplies no ionic current signal on either spark plug. An absence of an ionic current signal on the two spark plugs is therefore an indication that the combustion failure must have a different cause (a case in which both spark plugs are defective and supply no ionic current signal is highly improbable).

An increased recognition reliability occurs if the integrator value is queried after the ignition, but before the flame from one spark plug would reach the other. If this integration value is zero in the case of one of the two spark plugs, and higher than zero after the whole combustion cycle, the corresponding spark plug is defective. The time which the flame requires for passing through the combustion space can be calculated from engine-related parameters, such as the rotational speed, the load and/or the fuel-air ratio.

Other objects, advantages and novel features of the present invention will become apparent from the following detailed description of the invention when considered in conjunction with the accompanying drawings.

DETAILED DESCRIPTION OF THE DRAWINGS

Figure 1:
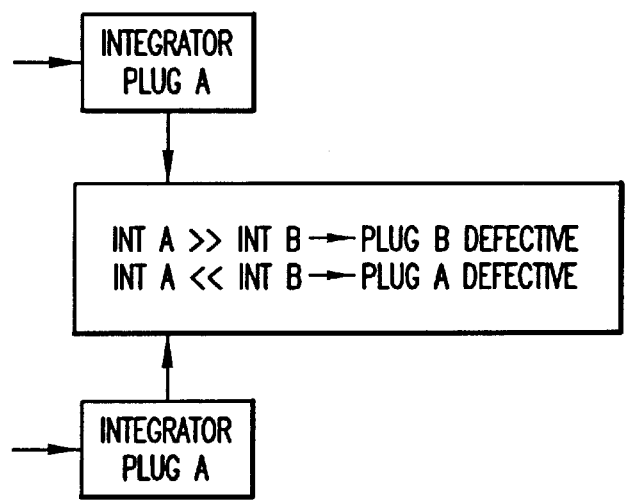
FIG. 1 shows a schematic block diagram of the process according to the invention.

As shown in FIG. 1, an integration of the ionic current signal of spark plug A and B over a full combustion cycle is performed. These integration values are then compared with one another. If the integration of the ionic signal from A is greater than the integration of the ionic signal from spark plug B, then plug B is defective. If the opposite is true, then plug A is defective.

Figure 2A:
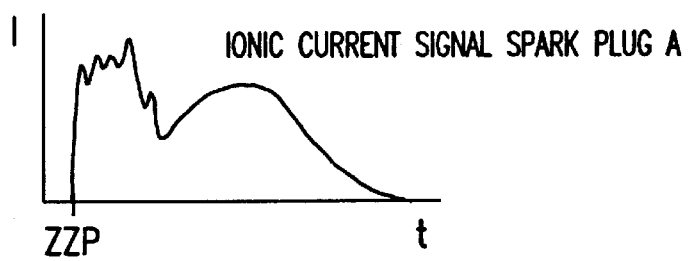
FIGS. 2(a) and 2(b) show plots of the Ionic Current of a of spark plugs A and B, respectively.
Figure 2B:
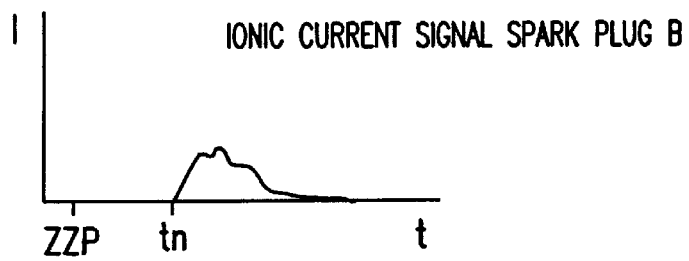

FIGS. 2(a) and 2(b) show plots of the ionic current of a of a spark plugs A and B, respectively, in which I represents the magnitude of the ionic current signal, ZZP represents the ignition point in time and $t_{fl}$ is the time of flame arrival at the defective spark plug B. In the case of a correct ignition (spark plug A, as shown in FIG. 2 (a)), a strong ionic current signal is generated immediately after the ignition. On the other hand, in the case of a defective spark plug (spark plug B, as shown in FIG. 2(b)), an ionic current signal (much weaker) occurs only after the period $t_{fl}$ which is necessary for the flame to travel from spark plug A to spark plug B following the ignition. An integration of the two ionic current signals over a full combustion cycle and comparison of the integrator values with one another enables a determination of which plug is defective. In the present case, plug B is defective.

Figure 3:
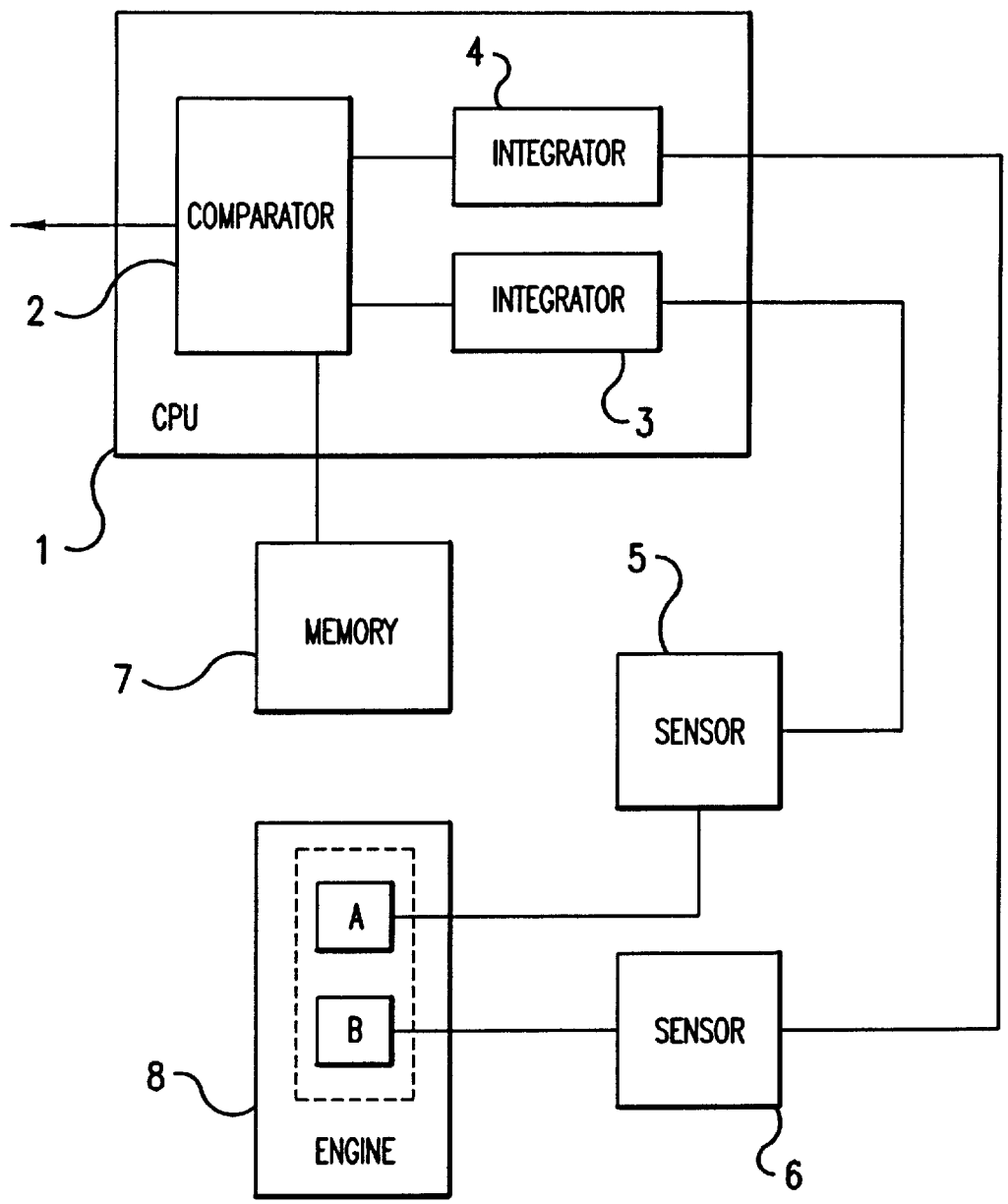
FIG. 3 is a schematic block diagram of an apparatus for implementing the process according to the invention.

FIG. 3 is an example of a system for implementing the process according to the invention. Shown therein is a CPU 1 which contains, inter alia, a comparator 2, a first integrator 3 and a second integrator 4. The comparator 2 is coupled to the first integrator 3 and :second integrator 4. The first integrator is coupled to a first sensor 5 which senses the ionic signal from the spark plug A. The second integrator is coupled to a second sensor 6 which senses the ionic signal from the spark plug B. Optionally, a memory 7 can be used for storing characteristic diagrams which are compared to the ionic signals measured at each spark plug during the determination of whether or not they are defective.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for recognizing ignition failures in an internal-combustion engine, said process comprising:
    providing at least one cylinder of said engine with two spark plugs per cylinder;
    simultaneously measuring an ionic current signal for each of the two spark plugs of a cylinder;
    integrating the measured ionic signal of the two spark plugs over at least an entire combustion cycle; and
    comparing integrated ionic signal values for the two spark plugs.

2. The process according to claim 1, further comprising:
    alternately measuring ionic current signals of the two spark plugs of a cylinder;
    integrating the ionic current signals of the two spark plugs of each cylinder over at least a whole combustion cycle; and
    comparing integrated ionic signal values for the two spark plugs with a stored value.

3. The process according to claim 2, wherein the stored value is a predetermined value characteristic of each of said two spark plugs.

4. Process according to claim 1, further comprising:
    querying the integrated ionic signal value from one of the two spark plugs after an ignition and before a point in time ($t_{fl}$) at which an ignition flame reaches the other of the two spark plugs.

5. Process according to claim 2, further comprising:
    querying the integrated ionic signal value from one of the two spark plugs after an ignition and before a point in time ($t_{fl}$) at which an ignition flame reaches the other of the two spark plugs.

6. An apparatus for recognizing ignition failures in an internal-combustion engine; comprising:
    a first sensor operatively coupled to a first spark plug for measuring a first ionic signal of the first spark plug;
    a second sensor operatively coupled to a second park plug for measuring a second ionic signal of the second spark plug;
    a first integrator operatively coupled to the first sensor for integrating the first ionic signal;
    a second integrator operatively coupled to the second sensor for integrating the second ionic signal; and
    a comparator operatively coupled to the first integrator and the second integrator;
    wherein the comparator compares the first integrated ionic signal with the second integrated ionic signal and outputs a signal representing an ignition failure in one of the first and second spark plugs based on said comparison.

7. An apparatus for recognizing ignition failures in an internal-combustion engine; comprising:
    a first sensor operatively coupled to a first spark plug for measuring a first ionic signal of the first spark plug;
    a second sensor operatively coupled to a second park plug for measuring a second ionic signal of the second spark plug;
    a first integrator operatively coupled to the first sensor for integrating the first ionic signal;
    a second integrator operatively coupled to the second sensor for integrating the second ionic signal;
    a comparator operatively coupled to the first integrator and the second integrator; and
    a memory operatively coupled to the comparator for storing predetermined values characteristic of said first and second spark plugs;
    wherein the comparator compares at least one of the first integrated ionic signal and the second integrated ionic signal with the predetermined values and outputs a signal representing an ignition failure in one of the first and second spark plugs based on said comparison.

* * * * *